(12) United States Patent
Trieb

(10) Patent No.: US 6,863,174 B1
(45) Date of Patent: Mar. 8, 2005

(54) SYSTEM FOR CONVEYING GOODS WITH A SELF-CONTAINED CONVEYOR BELT

(75) Inventor: Herbert Trieb, Wolfurt (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 10/850,926

(22) Filed: May 21, 2004

(30) Foreign Application Priority Data

Dec. 4, 2003 (AT) ................................... A 1942/2003

(51) Int. Cl.[7] ............................................. B65G 15/60
(52) U.S. Cl. ...................... 198/838; 198/845; 198/819
(58) Field of Search ................................. 198/838, 845, 198/818, 819, 821, 824, 678.1, 464.4, 681

(56) References Cited

U.S. PATENT DOCUMENTS

| | | | | |
|---|---|---|---|---|
| 4,380,288 A | * | 4/1983 | Bodimer et al. ............ 198/820 |
| 4,557,373 A | * | 12/1985 | Paurat et al. ............... 198/819 |
| 5,699,894 A | * | 12/1997 | Bestgen et al. .......... 198/678.1 |
| 5,791,454 A | | 8/1998 | Trieb | |
| 6,039,171 A | * | 3/2000 | Trieb .......................... 198/821 |

FOREIGN PATENT DOCUMENTS

EP        0 745 545 A2   12/1996

* cited by examiner

*Primary Examiner*—James R. Bidwell
(74) *Attorney, Agent, or Firm*—Laurence A. Greenberg; Werner H. Stemer; Ralph E. Locher

(57) ABSTRACT

A system for conveying goods by way of a self-contained conveyor belt which, in the end stations, is guided over reversing pulleys. The conveyor belt is constructed with load-bearing rollers that can be moved along load-bearing cables. In this case, each run of the conveyor belt is assigned only a single load-bearing cable located above the respective run and load-bearing brackets projecting upward are fixed to the conveyor belt. The load-bearing rollers are mounted at the upper ends of the brackets.

9 Claims, 6 Drawing Sheets

SYSTEM FOR CONVEYING GOODS WITH A SELF-CONTAINED CONVEYOR BELT

BACKGROUND OF THE INVENTION

FIELD OF THE INVENTION

The present invention relates to a system for conveying goods by way of a self-contained conveyor belt which, in the end stations, is guided over reversing pulleys and which is constructed with load-bearing rollers which can be moved along load-bearing cables.

Such a system is disclosed in my commonly assigned, prior U.S. Pat. No. 5,791,454 and its corresponding European patent application EP 0 745 545 A2. There, the conveyor belt is constructed with load-bearing beams aligned transversely thereto, at the ends of which load-bearing rollers are mounted which can be moved along load-bearing cables provided in the system. Known such systems are advantageous since long span widths can be achieved by way of the load-bearing cables. In this way, the erection of a large number of load-bearing frames can be dispensed with in these systems. Furthermore, in this way, such systems can also be erected in topographically unfavorable situations. In particular, with such systems it is possible to effect the conveyance of goods over obstacles, such as valleys or rivers, in a straightforward manner.

However, the prior systems are disadvantageous inasmuch as they require two load-bearing cables for both runs of the conveyor belt, which have to be supported and braced and means that a great deal of expenditure on construction is caused by the erection of these systems.

SUMMARY OF THE INVENTION

It is accordingly an object of the invention to provide an installation for conveying goods with a continuous conveyor belt which overcomes the above-mentioned disadvantages of the heretofore-known devices and methods of this general type and which further simplifies such a system in design terms without thereby reducing or impairing its functional capabilities.

With the foregoing and other objects in view there is provided, in accordance with the invention, a system for conveying goods, comprising:
end stations each having a reversing pulley;
a self-contained conveyor belt movably disposed to travel between the end stations in at least two runs and to be guided over the reversing pulleys;
a plurality of load-bearing brackets mounted to the conveyor belt and projecting generally upwardly from the conveyor belt;
load-bearing rollers mounted to the load-bearing brackets;
load-bearing cables extending between the end stations, a respective one of the load-bearing cables supporting the conveyor belt along a respective one of the runs via the load-bearing rollers.

In other words, each run of the conveyor belt is assigned only a single load-bearing cable located above the relevant run and upwardly-projecting load-bearing brackets are fixed to the conveyor belt, at the upper ends of which brackets the load-bearing rollers rolling along the load-bearing cables are mounted.

The reversing pulleys located in the end stations can preferably be rotated about approximately vertical axes. Moreover, the conveyor belt is preferably constructed with corrugated edges.

According to a preferred embodiment, the load-bearing brackets are designed to be angled over, the approximately horizontally aligned leg being firmly connected to the conveyor belt and at least one load-bearing roller being mounted at the upper end of the second leg projecting upward from this leg. Furthermore, in the end stations there are preferably provided guide rails which are assigned to the load-bearing rollers and by means of which the load-bearing brackets are guided such that the conveyor belt is pivoted from its approximately horizontal position into an approximately vertical position, wherein it is moved around the reversing pulleys, whereupon it is pivoted into the approximately horizontal position again, the conveying side of the conveyor belt being oriented upward in both runs. Furthermore, a guide plate produced in articular from rubber is preferably provided on each load-bearing bracket, underneath the load-bearing roller.

Moreover, in the region of the supports, the load-bearing cables are preferably guided over supporting blocks which can be moved in the longitudinal direction of the load-bearing cables and, in the region of the supports, the conveyor belt is guided over supporting rolls.

Other features which are considered as characteristic for the invention are set forth in the appended claims.

Although the invention is illustrated and described herein as embodied in a system for conveying goods by means of a self-contained conveyor belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
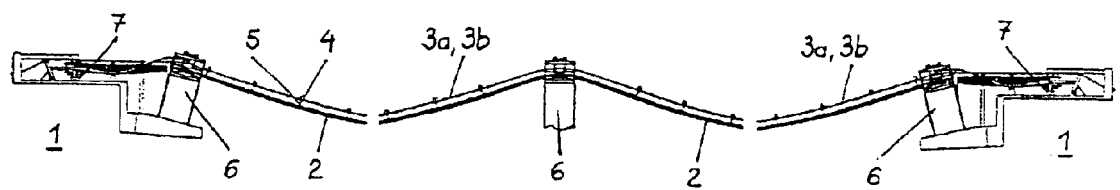
FIG. 1 is a schematic side view of a system according to the invention.

Referring now to the figures of the drawing in detail and first, particularly, to FIG. 1 thereof, a system according to the invention for conveying goods comprises two end stations 1, between which an endless, i.e., self-contained conveyor belt 2 for the transport of bulk goods (e.g., building materials, waste materials, ores, etc.) can be moved. One of the end stations is thereby used as a loading station and the other end station is used as an unloading station. Assigned to the two runs of the conveyor belt 2 are two load-bearing cables 3a, 3b. The conveyor belt 2 is carried and moved by load-bearing rollers 4 which roll on the load-bearing cables 3 and which are mounted on load-bearing brackets 5. Provided in the end stations 1 and along the section are load-bearing frames 6, over which the conveyor belt 2 and the load-bearing cables 4 are guided. Moreover, in the end stations 1, the conveyor belt 2 is guided over reversing pulleys 7 which can be rotated about vertically aligned axes. In this case, at least one of the reversing pulleys 7 is driven by means of a drive motor.

Figure 2:
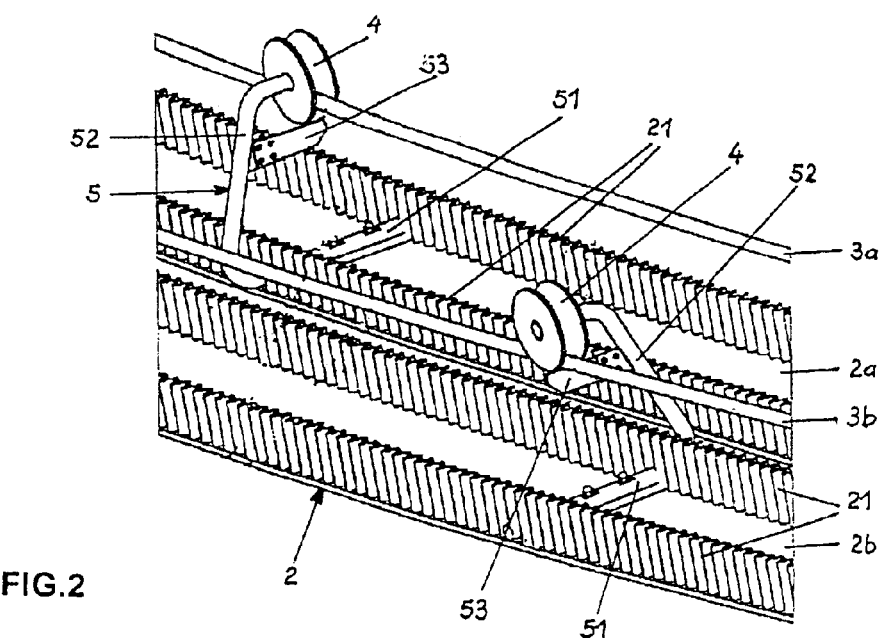
FIG. 2 is an axonometric illustration of a section of the conveyor belt.
Figure 3:
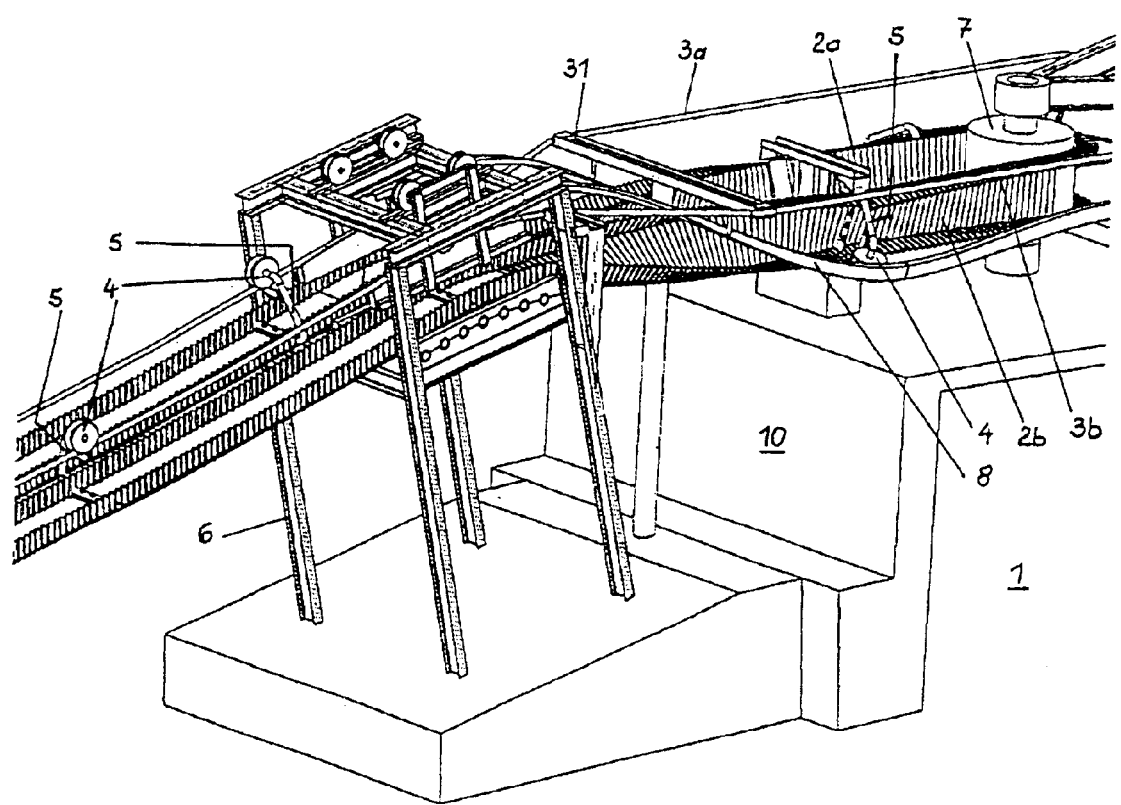
FIG. 3 is an axonometric illustration of the right-hand end station of the system of FIG. 1, with a load-bearing frame.
Figure 4:
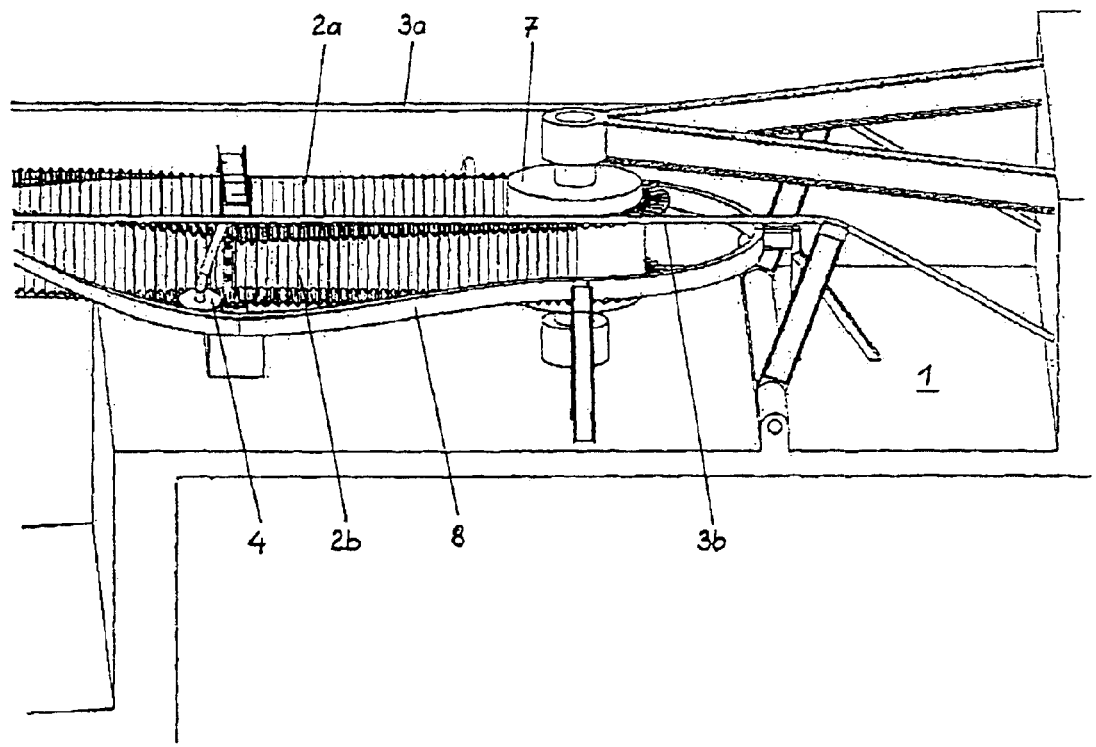
FIG. 4 shows the end station according to FIG. 3 in an illustration enlarged with respect thereto.
Figure 5:
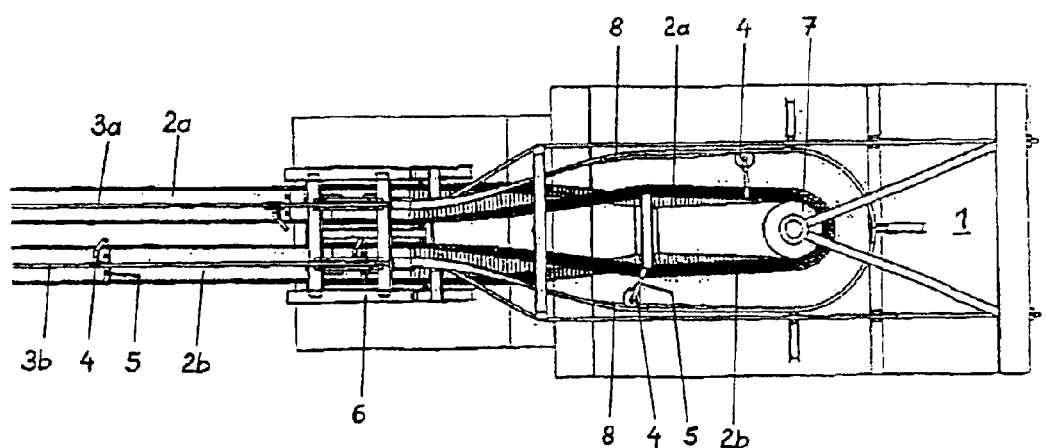
FIG. 5 is a plan view of the end station according to FIG. 3.

As can be seen from FIG. 2, the conveyor belt 2 is constructed with corrugated edges 21, or sidewalls 21. On account of the guidance carried out in the end stations 1 of the conveyor belt 2 over the reversing pulleys 7 that can be rotated about vertical axes, the two runs 2a and 2b of the conveyor belt 2 are at the same vertical level. The load-bearing brackets 5 are angled over approximately in an L shape, the approximately horizontal legs 51 being firmly connected to the conveyor belt 2 and the load-bearing rollers 4, which roll on the load-bearing cable 3a, 3b assigned to the respective run 2a, 2b, being mounted at the upper end of the legs 52 projecting obliquely upward. Also fixed to the upwardly projecting legs 52 of the load-bearing brackets 5 are transversely projecting guide plates 53, which are located underneath the load-bearing rollers 4 and which are used to prevent cable derailments. The guide plates 53, which are produced from rubber, have a high rigidity with respect to loadings in the direction of their plane, which means that they ensure the guidance of the running rollers 4 on the load-bearing cables 3a, 3b. By contrast, they can be bent elastically out of their plane, which ensures that the running rollers 4 can be lifted off the load-bearing cables 3a, 3b in the end stations.

As can be seen in particular from FIGS. 3 to 6, in the end stations 1 the conveyor belt 2 is guided over in each case a reversing pulley 7 that can be rotated about a vertical axis. In the process, the run 2b of the conveyor belt 2 moved toward the reversing pulley 7 is pivoted out of the horizontal plane into a vertical plane and is moved around the reversing pulley 7 in this position. The run 2a of the conveyor belt 2 moved away from the reversing pulley 7 is subsequently pivoted into the horizontal plane again. In this case, the pivoting actions are carried out in such a manner that the conveying side of the conveyor belt 2 is oriented upward in both runs 2b and 2a. The two load-bearing cables 3a, 3b are braced in the foundations 10 of the end station.

In the end stations 1, guide rails 8 assigned to the load-bearing rollers 4 are provided, by means of which the pivoting of the conveyor belt 2 in the regions of the end stations 1 of the system is controlled. In addition, in the regions between the load-bearing frames 6 and the reversing pulleys 7, between the two load-bearing cables 3a and 3b, a supporting beam 31 is provided, by means of which the two cables 3a and 3b are kept at a distance from each other in such a way that the space required for the guide rail 8 is available between them and, moreover, during the pivoting of the conveyor belt 2 and also the brackets 5 fixed to the latter and the load-bearing rollers 4 mounted on said brackets, the load-bearing rollers 4 are prevented from colliding with the load-bearing cables 3a, 3b.

Figure 6:
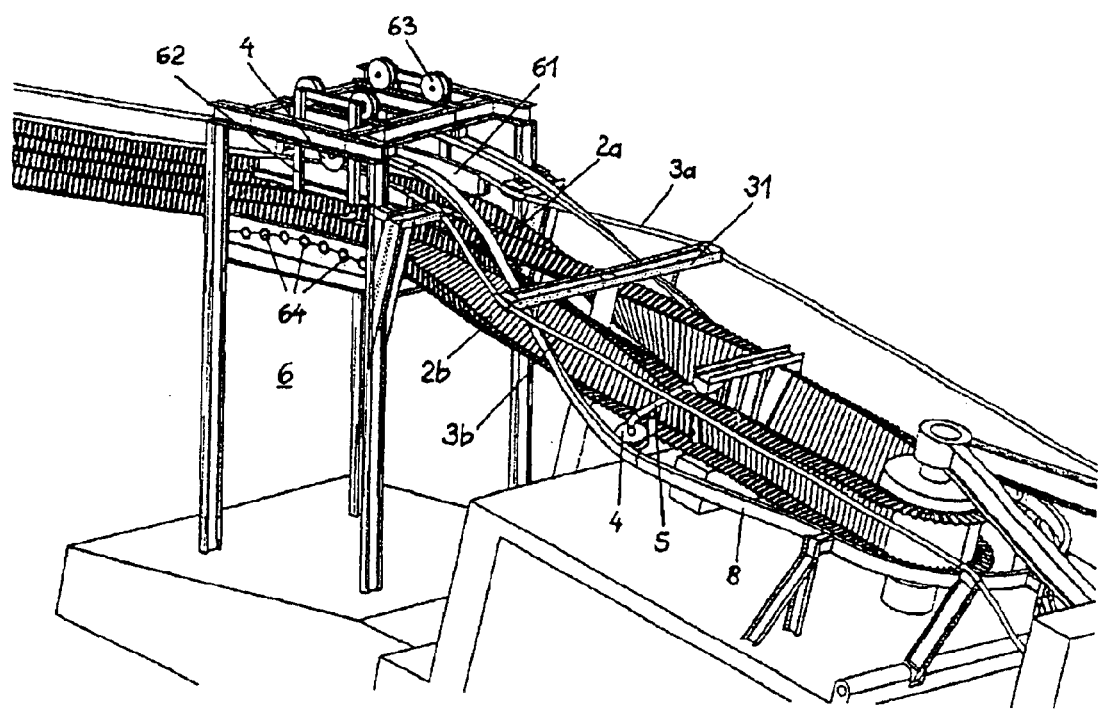
FIG. 6 is an axonometric illustration showing the load-bearing frame located in the same end station.
Figure 7:
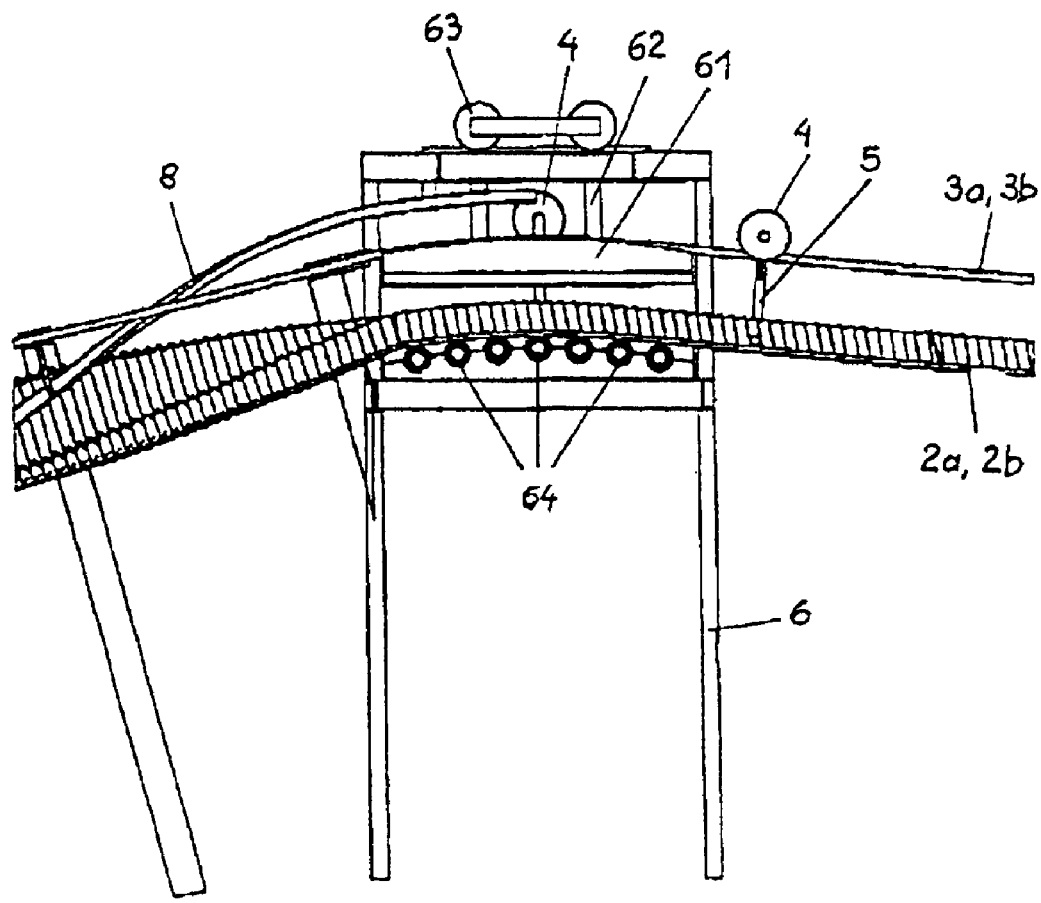
FIG. 7 is a side view of the load-bearing frame in the left-hand end station provided according to FIG. 1.
Figure 8:
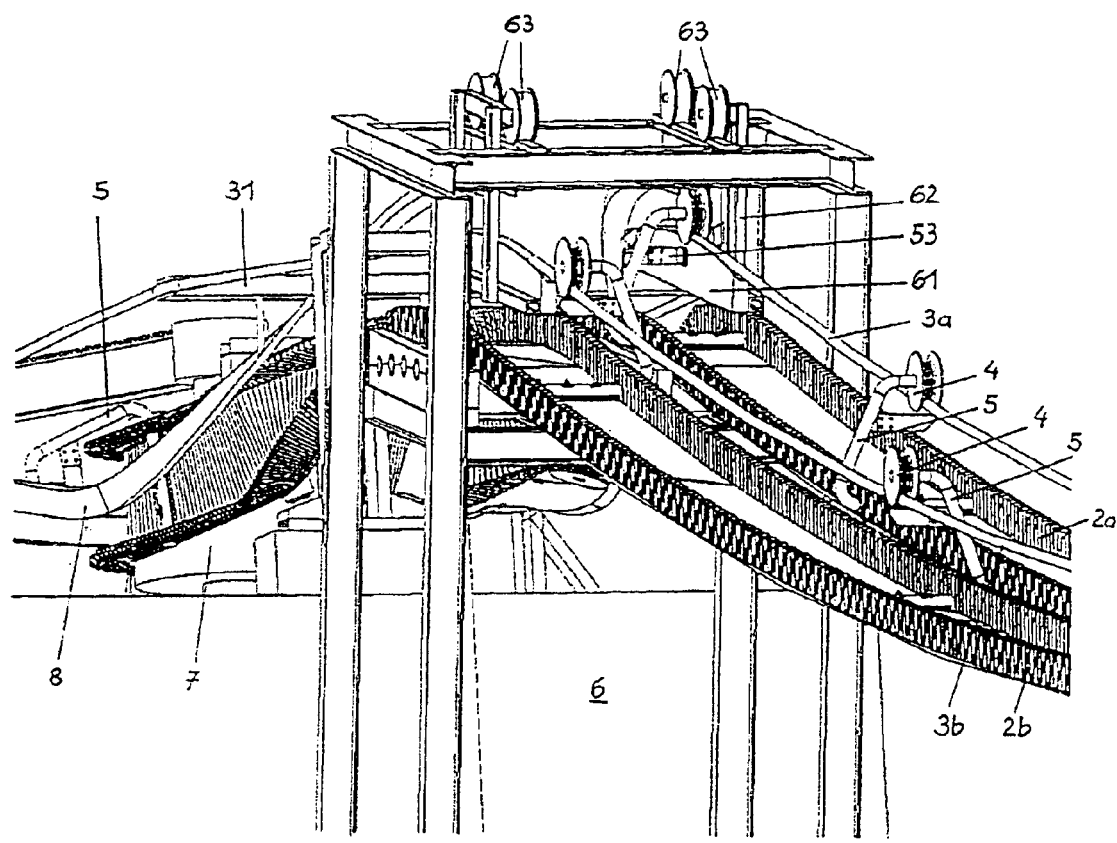
FIG. 8 is an axonometric illustration of details of the load-bearing frame according to FIG. 7.

As can be seen from FIG. 6 to FIG. 8, supporting blocks 61 are provided in the load-bearing frames 6, over which supporting blocks the load-bearing cables 3a and 3b are guided and by means of which the vertical position of the latter is determined. The supporting blocks 61 are in this case arranged on load-bearing trestles 62, which can be moved in the direction of the load-bearing cables 3a, 3b by means of running rollers 63. In this way, the cable forces occurring on the two sides of the supports 6 are balanced. Supporting blocks of this type are provided in all the load-bearing frames 6.

Furthermore, a plurality of supporting rolls 64 are mounted in all the load-bearing frames 6, over which rolls the two runs 2a, 2b of the conveyor belt 2 are guided, which determines the vertical position of the conveyor belt 2. The supporting rolls 64 support the two runs 2a and 2b of the conveyor belt 2, which means that the loadings caused by the conveyor belt 2 are absorbed directly by the load-bearing frames 6. In this way, the load-bearing rollers 4 are relieved of load. In addition, the run 2a of the conveyor belt 2 moving toward the reversing pulley 7 is raised in the region of the load-bearing frame 6. The guide rails 8 provided in the end stations begin and end above the supporting blocks 61 and the supporting rolls 64. Together with the conveyor belt 2, the load-bearing rollers 4 are also raised, as a result of which they are lifted off the load-bearing cable 3a and are led into the guide rails 8 by means of which they are guided during their movement through the end stations 1. Likewise, the load-bearing rollers 4 running out of the guide rails 8 are also guided by this means such that they pass on to the load-bearing cable 3b resting on the supporting blocks 61.

As can further be seen from FIG. 8, during the movement into the end stations 1, the guide plates 53 run onto the supporting blocks 61, by which means they are bent out of their plane. In this way, they are moved away from the load-bearing cable 3a, which means that the load-bearing rollers 4 can be lifted off the load-bearing cable 3a. Likewise, the guide plates 53 moved away from the end stations 1 are firstly bent over by the supporting blocks 61 and subsequently pass under the load-bearing cable 3b again. The supporting blocks 61 provided on the load-bearing frames 6 located along the section act in the same way.

By means of the guide rails 8, the pivoting movement of the conveyor belt 2 from its horizontal position into its vertical position and, following this, into the horizontal position again is controlled. In the process, the pivoting movement of the conveyor belt 2 is carried out in such a way that, even in the run of the conveyor belt 2 moving back from the unloading station to the loading station, its conveying side is oriented upward. This ensures that proportions of the conveyed goods remaining on the conveyor belt 2 remain on the returning run of the conveyor belt 2, which means that measures to protect the regions underneath the conveyor system can be dispensed with.

In addition, it is pointed out that the side walls of the conveyor belt do not need to be constructed as corrugated edges. Instead, they can, for example, also be constructed with continuous slots going from top to bottom, as a result of which they can likewise be moved around the reversing pulleys. Furthermore, a conveyor system of this type can also be constructed in such a way that both end stations are designed both as a loading station and as an unloading station, the conveyance of goods in both directions of movement of the conveyor belt being carried out by means of the two runs.

I claim:

1. A system for conveying goods, comprising:
   end stations each having a reversing pulley;
   a self-contained conveyor belt movably disposed to travel between said end stations in at least two runs and to be guided over said reversing pulleys;

a plurality of load-bearing brackets mounted to said conveyor belt and projecting generally upwardly from said conveyor belt;

load-bearing rollers mounted to said load-bearing brackets;

load-bearing cables extending between said end stations, a respective one of said load-bearing cables supporting said conveyor belt along a respective one of said runs via said load-bearing rollers.

2. The system according to claim 1, wherein said reversing pulleys are disposed in said end stations to be rotatable about substantially vertical axes.

3. The system according to claim 1, wherein said conveyor belt is formed with corrugated edges.

4. The system according to claim 1, wherein said load-bearing brackets are angled brackets, said brackets including a substantially horizontal leg firmly connected to said conveyor belt and a further leg projecting upwardly from said substantially horizontal leg and having an upper end, and wherein at least one of said load-bearing rollers is mounted at said upper end of said further leg.

5. The system according to claim 1, which comprises guide rails mounted in said end stations and assigned to said load-bearing rollers, said guide rails guiding said load-bearing brackets for pivoting said conveyor belt from a substantially horizontal position into a substantially vertical position, for movement about the respective said reversing pulley, whereupon said conveyor belt is once more pivoted into the substantially horizontal position, and wherein a conveying side of said conveyor belt is oriented upward in both runs.

6. The system according to claim 1, which comprises a guide plate disposed on each load-bearing bracket underneath the respective said load-bearing roller.

7. The system according to claim 6, wherein said guide plate is a rubber plate.

8. The system according to claim 1, which comprises a plurality of supports wherein said load-bearing cables are guided over supporting blocks movably disposed in a longitudinal direction of said load-bearing cables.

9. The system according to claim 8, which comprises supporting rolls disposed in said supports, wherein said conveyor belt is guided over said supporting rolls in a region of said supports.

* * * * *